April 26, 1938.  O. L. HERRON ET AL  2,115,224
VEHICLE ROOF
Filed July 13, 1933
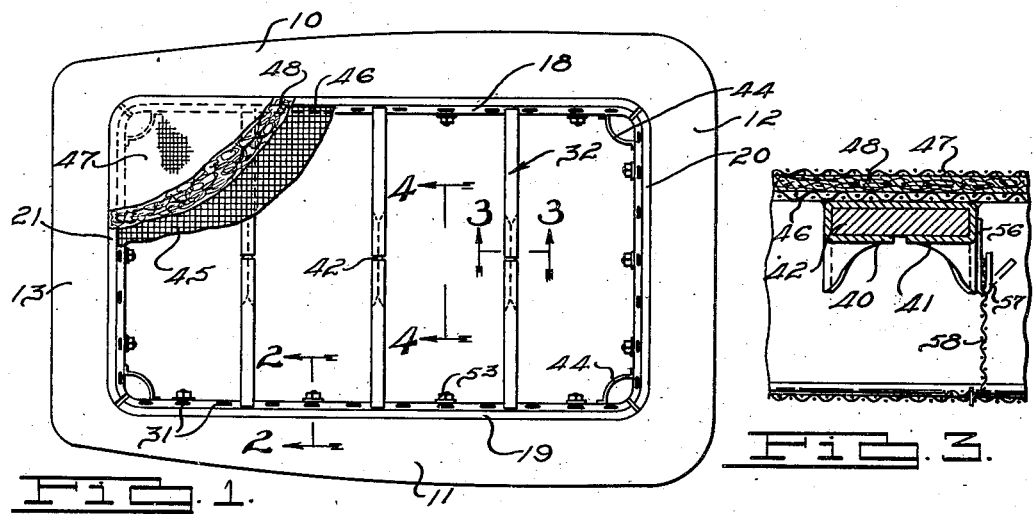
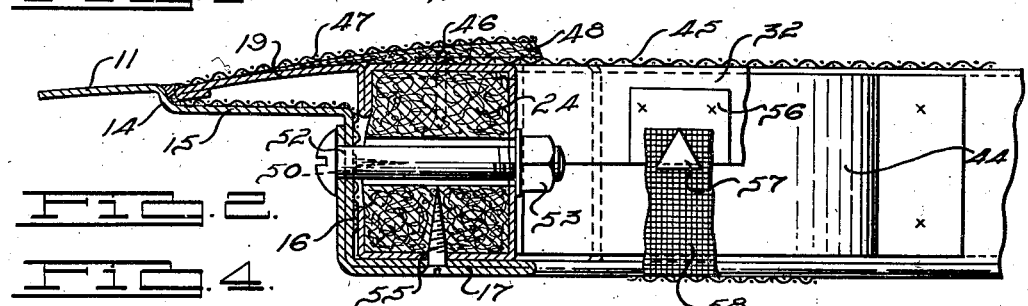
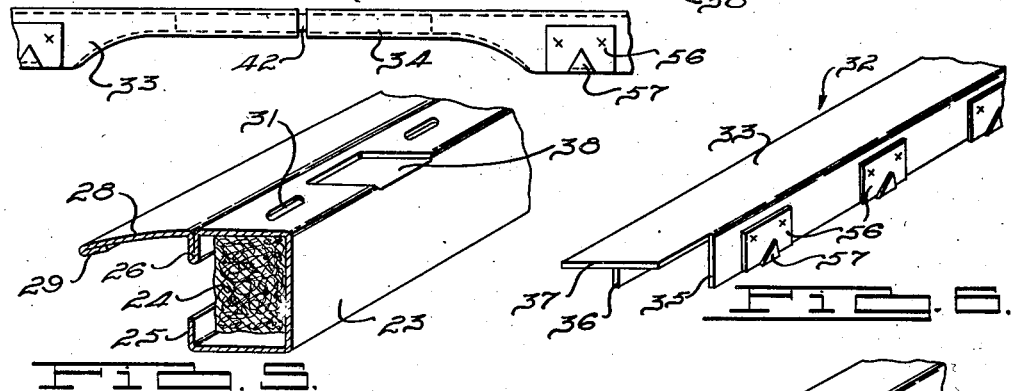
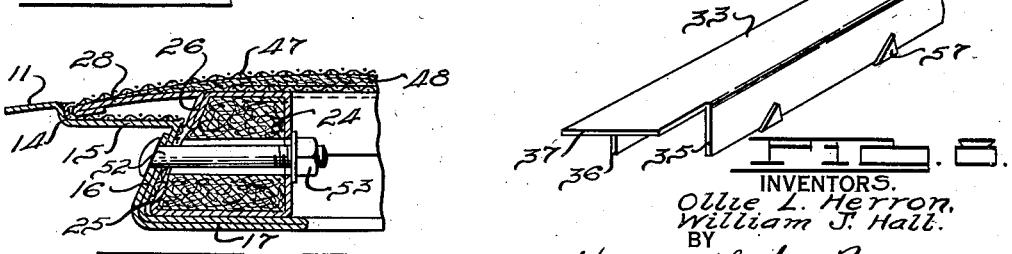
INVENTORS.
Ollie L. Herron,
William J. Hall.
BY
Harness, Wickey, Pierce & Hann.
ATTORNEYS.

Patented Apr. 26, 1938

2,115,224

UNITED STATES PATENT OFFICE 2,115,224

VEHICLE ROOF

Ollie L. Herron, Chicago, Ill., and William J. Hall, Detroit, Mich., assignors to Herron-Zimmers Moulding Co., a corporation of Illinois Application July 13, 1933, Serial No. 680,186

2 Claims. (Cl. 296—137)

The invention relates to motor vehicles and it has particular relation to a roof construction for automobile bodies.

In certain respects the invention is similar to and constitutes an improvement over that embodied in the co-pending application for patent of Ollie L. Herron, Serial No. 672,593, filed May 24, 1933, now Patent #2,062,177, and which also relates to vehicle roofs.

One object of the present invention is to provide an insertable roof for an automobile body having an opening therefor, wherein the construction of the roof is such that it may be manufactured economically and the parts thereof assembled efficiently according to present day requirements.

Another object of the invention is to provide an insertable and expansible roof comprising side and end frame members, wherein improved means are used for interconnecting the frame members to render the roof expansible in its own plane.

Another object of the invention is to provide an insertable roof in its own plane for the purpose of obtaining a close fit between the edges of the roof and the edges of the body panels defining the roof opening, wherein the frame members comprising the roof construction serve also as retaining means for fillers to which the waterproof roof covering may be secured.

Other objects of the invention will become apparent from the following description, the drawing relating thereto, and the claims hereinafter set forth.

For a better understanding of the invention, reference may be had to the drawing, wherein:

Figure 1 is a fragmentary plan view of an automobile body, having a roof constructed according to one form of the invention, with certain parts removed for illustrating details more clearly.

Fig. 2 is a cross-sectional view on a larger scale taken substantially along the line 2—2 of Fig. 1.

Fig. 3 is a cross-sectional view on a larger scale taken substantially along the line 3—3 of Fig. 1.

Fig. 4 is a side view of one of the cross bows of the roof construction, as seen along the line 4—4 of Fig. 1.

Fig. 5 is a fragmentary and perspective view of one of the frame members forming a part of the roof frame.

Fig. 6 is a fragmentary and perspective view of one of the cross bows illustrating attaching means for securing the head lining to the roof.

Fig. 7 is a cross-sectional view similar to Fig. 2, illustrating another form of the invention.

Fig. 8 is a fragmentary and perspective view of one of the cross bows illustrating a different construction for fastening the head lining to the roof.

Referring to Fig. 1, the side quarter panels of the vehicle body are indicated at 10 and 11, the rear quarter panel at 12 and the header panel at 13. As seen in Fig. 2, the panels at their inner edges extend downwardly as indicated at 14 and then laterally as indicated at 15 to provide an upper rabbet, and the portion 15 at its inner edge extends downwardly and laterally as indicated at 16 and 17, and then the metal is reversed and bent around these portions to provide walls of double thickness. These walls provide a lower rabbet which is disposed inwardly of the upper rabbet.

The insertable roof comprises opposed side frame members 18 and 19 and opposed end members 20 and 21. Each of these frame members as best shown by Figs. 2 and 5, comprises a channel portion 23 having a tacking filler 24 therein, and for retaining the filler in position, a lower lip 25 is provided on one leg of the channel, whereas the other leg of the channel is first bent downwardly and then upwardly as indicated at 26 to provide a second lip for retaining the filler in place. From the folded lip 26, the metal extends laterally as indicated at 28 and its extreme edge is reversely bent as indicated at 29 to provide a rounded edge for this flange. For a purpose that will presently be mentioned, the upper leg of the channel is provided with elongated openings 31 which are disposed at spaced points along the frame member.

The side frame members 18 and 19 are connected by a plurality of cross bows 32 as shown by Fig. 1, and as shown by Fig. 4, each of these cross bows includes channel sections 33 and 34 respectively secured to the side members. As illustrated best in Fig. 6, each of the channel sections 33 and 34 has depending legs 35 and 36 and at the outer ends of the sections, the upper and base portion of the channel is extended as indicated at 37. This portion 37 of each channel section is welded for example to the upper side of the channel frame member, and in order to avoid having it protrude above the frame member, the latter at spaced points is provided with depressions or pockets indicated at 38 in Fig. 5. The ends of the legs 35 and 36 substantially abut the inner and vertical side wall or base portion of the channel frame members and if desired, the ends of the legs 35 and 36 may also be welded to the frame members.

As shown by Fig. 3, the inner ends of the channel sections 33 and 34 have their legs 35 and 36 folded as indicated at 40 and 41 thereby providing a guideway at the inner ends of the sections. The sections are connected by means of a bar 42 extending into the guideways, and which fits therein in a relatively tight manner although still permitting movement of the sections apart when the roof is expanded.

Each of the end frame members 20 and 21 is connected at its ends to the adjacent ends of the side frame members 18 and 19 by means of an arcuate, metal member 44 that is welded or otherwise secured at its ends to the frame members. It will be noted in this connection that at each corner of the roof frame, the frame members are slightly arcuate to provide an arcuate corner and initially such ends substantially abut.

The roof includes a wire screen or other and suitable layer 45 which extends over the cross bows and frame members and is secured to the tacking strips 24 in the latter by means of staples or tacks as indicated at 46 which project through the elongated openings 31 in the frame members. This screen or supporting layer, supports cotton batting or other suitable material 48 and over the cotton batting, a waterproof covering 47 is provided. The edges of the cover 47 extend over the flanges 28 of the frame members and the edges 29 thereof, and then under the flanges and along the lips 25 and 26. Between these lips, the fabric is tacked or otherwise secured as indicated at 50, to the tacking material 24.

When the roof is inserted in the opening therefor within the quarter shell construction of the body, the flange 28 of the frame members is adapted to extend into the upper rabbet while the channel portions of such frame members are adapted to extend into the lower rabbet. For expanding the roof longitudinally as well as transversely, bolts 52 extend through openings in the wall portion 16 of the body panels, and between the lips 25 and 26 of the frame members, and then through the tacking material 24 and through the inner wall of the frame members where they are provided with nuts 53. It will be noted that the tacking material and the inner wall of the frame members have larger openings than required for receiving the bolts and this facilitates inserting the bolts. When the nuts are tightened, it is apparent that the roof may be expanded laterally and longitudinally, and this moves the flange portion 28 further into the rabbet provided therefor, and upon sufficient expansion, the edge 29 covered by the waterproof cover 47, may be brought into engagement with the downwardly directed portion 14 of the quarter shell at the outer edge of the upper rabbet. Simultaneously, the channel portions of the frame members are drawn closer into the lower rabbet and may be brought into engagement with the wall portion 16 of the quarter shell construction. This manner of expanding the roof closes any interstices between the edge of the roof and the quarter shell construction so as to prevent leakage and avoids the usual necessity in roof constructions of employing considerable sealing material between spaced portions. It may be desirable however to use a small amount of sealing filler at the edge of the flange 28 and adjacent the portion 14 of the body panel as shown by Fig. 2. It will be appreciated that this expansion of the roof tightens and may even stretch the cover 47, thus insuring a tight cover in the finished construction. After so disposing the roof in position and expanding it as described, screws 55 may be employed for connecting the frame members to the portion 17 of the quarter shell construction, so as to positively draw the roof downwardly and maintain parts thereof positively in contact with the shell construction.

A head lining usually provided in the interior of the vehicle, may be secured to the roof by providing plate elements 56 on the cross bows, which have prongs 57. Ordinarily, the head lining has upwardly extending fabric portions 58 secured thereto and in securing the head lining to the cross bows, such portions 58 are hooked over the prongs 57 and then the latter are bent against the channel leg portions of the cross bows. If desired, prongs 57 may be formed integrally with the legs of the channel cross bows as shown by Fig. 8, thereby avoiding the use of separate attaching plates 56.

Fig. 7 illustrates a slightly different construction wherein the portion 16 of the shell construction is angled outwardly and downwardly and the lips 24 and 26 on the frame members at the outer edge of the channel portions are similarly angled. In expanding a frame of this character, the tapered relation between the lips 25 and 26 and the wall portion 16 of the shell construction, enables drawing the frame downwardly during its expansion and particularly during the final drawing operation where the frame members are brought into engagement with the wall 16. It will be understood that the base portions of the channel members initially are spaced slightly from the lower wall portion 17 of the shell construction to permit this drawing downwardly during the final expanding operation and that the roof is positively held against any tendency to move upward by the interlocking tapers on the shell and frame members.

In roofs of the character illustrated, the edges of the roof may be brought closely into engagement with receiving portions of the quarter shell construction so as to eliminate interstices that usually must be filled with sealing material, which in the course of time deteriorates and permits leakage through the roof. Moreover the invention provides a roof construction which is relatively simple and permits its manufacture in an economical and efficient manner.

While more than one form of the invention has been illustrated and described in detail, it will be apparent to those skilled in the art that various modifications may be made without departing from the scope of the appended claims.

We claim:

1. In a vehicle body, an insertable roof comprising a pair of side and a pair of end frame members, expansible means connecting one of said pair of frame members, and expansible means connecting the ends of the frame members at the corners of the roof, the last mentioned means comprising arcuate strips, joining the corner portions of the frame members and being adapted to permit expansion of one frame member longitudinally of the other frame member owing to the longitudinal extensibility of the strips.

2. In a vehicle body, an insertable roof comprising a pair of side and a pair of end frame members, and expansible means connecting the frame members including arcuate strips joining the corner portions of the frame members and being adapted to permit expansion of one frame member longitudinally of the other owing to longitudinal extensibility of the strip.

OLLIE L. HERRON.
WILLIAM J. HALL.